(No Model.)
V. W. CODDINGTON.
SEPARABLE PULLEY.
No. 443,269. Patented Dec. 23, 1890.
Fig. 1.
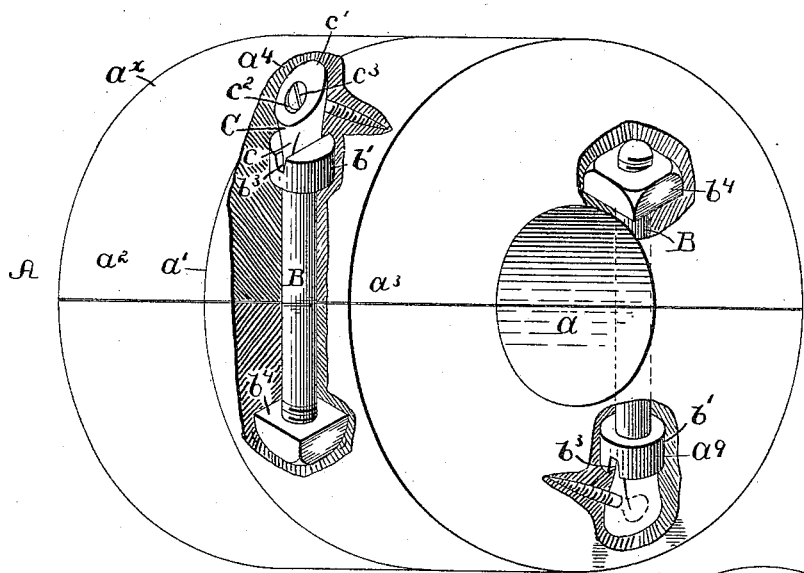
Fig. 2.  Fig. 3.
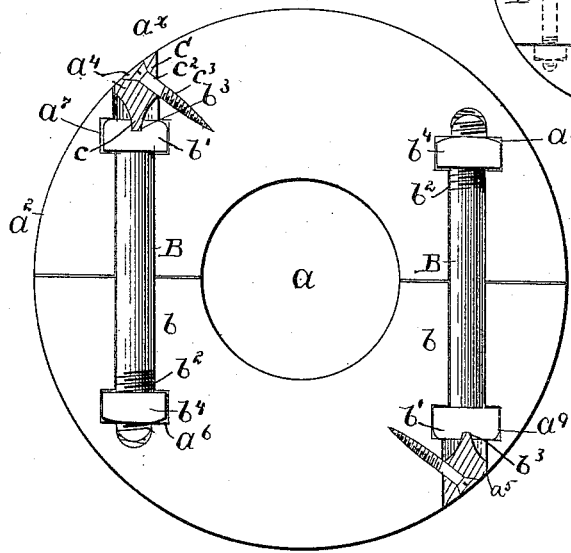
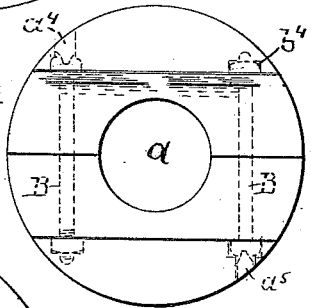
Witnesses:
F. G. Fischer
S. L. C. Hasson
Inventor:
Vantyle W. Coddington
By Rich & Manning Atty.

UNITED STATES PATENT OFFICE.

VANTYLE W. CODDINGTON, OF KANSAS CITY, MISSOURI.

SEPARABLE PULLEY.

SPECIFICATION forming part of Letters Patent No. 443,269, dated December 23, 1890.

Application filed May 14, 1890. Serial No. 351,825. (No model.)

*To all whom it may concern:*

Be it known that I, VANTYLE W. CODDINGTON, a citizen of the United States, residing at Kansas City, in the county of Jackson and State of Missouri, have invented certain new and useful Improvements in Separable Pulleys; and I do hereby declare that the following is a full, clear, and exact description of the invention, such as will enable others skilled in the art to which it appertains to make and use the same, reference being had to the accompanying drawings, forming a part of this specification.

My invention has for its object, first, to prevent the accidental displacement of any of the clamping attachments upon the respective parts of a separable pulley when upon the driving-shaft or removed therefrom, and, second, to prevent the clamping-bolts from turning; and it consists in the novel construction and combination of parts, which will first be fully described, and specifically pointed out in the claims.

In the drawings, Figure 1 is a view in perspective of the separable pulley with portions broken away to show the clamping-bolts and bolt-retaining pockets and the line of separation in a transverse direction to the shaft. Fig. 2 is an interior view of one of the parts of the separable pulley separated transversely to the shaft and showing the concealed grooves for the bolts and the pockets for the bolt-heads and nuts. Fig. 3 is a side view of the pulley, showing the key removed.

Similar letters of reference indicate corresponding parts in all the figures.

My invention is more particularly applicable to small-sized pulleys for shafts, which require adjustable concealed clamping attachments, by means of which the pulley may be secured or removed quickly from the shaft. Heretofore such concealed attachments have not, however, prevented the working loose of one or the other part of the said clamping attachment and the consequent loss of utility of the pulley. This I obviate as follows:

A represents a web-pulley, which is preferably turned in a lathe and made in the proper dimensions, with a periphery $a^\times$ and a central opening $a$ to receive the bushing of shaft. In a transverse direction to the axis of its shaft on line $a'$ said pulley A is separated into two equal sections or parts $a^2$ $a^3$. Upon the inner end portion of one separate portion or section $a^2$ of the pulley on both sides of the shaft and in parallel lines transverse to said shaft-opening $a$ are made the longitudinal grooves $a^4$ $a^5$, each one of which is of the comparative width and depth of one-half of an ordinary bolt separated in the line of its diameter, and each groove extends in opposite directions to within a short distance of the periphery of said pulley. Intersecting with the groove $a^4$ in one direction and near its terminus is made a transverse rectangular-shaped depression or pocket $a^6$, which extends below the bottom of the said groove $a^4$. In the other direction the groove $a^4$ is extended through the periphery $a^\times$ of the pulley, and a short distance from said periphery is made an intersecting cylindrical-shaped depression or pocket $a^7$. The groove $a^5$ corresponds in length to the groove $a^4$ and is extended through the periphery $a^\times$ of the pulley in the direction opposite to that described by the said groove $a^4$. Intersecting with the groove $a^5$, nearly in line with the pockets or depressions $a^6$, is made a depression $a^9$, and nearly in line with the pocket $a^7$ is made a similar pocket $a^8$. In the inner end portion of the other separable part $a^3$ of the pulley are made registering grooves and depressions, which are a complement of the grooves $a^4$ $a^5$ and depressions or pockets $a^6$ $a^7$ $a^8$ $a^9$ in the part $a^2$ and correspond exactly in position and extent. In the grooves $a^4$ $a^5$ are placed the shanks $b$ of the respective clamping-bolts B, and in the depressions $a^7$ $a^9$ are placed the heads $b'$ of said bolts, which are, as seen, reversed. The other ends $b^2$ of the bolts B are screw-threaded. In the head $b'$ of each bolt is made a transverse groove or socket $b^3$. In the depressions or pockets $a^6$ $a^8$ are placed the rectangular nuts $b^4$, which receive the threaded end of the bolt B. The two parts $a^2$ $a^3$ and nuts are then glued or otherwise fastened permanently together. The pulley is then separated in the line of the diameter of the axis of its shaft into two separable parts. Within the perforations formed by the grooves $a^4$ $a^5$ and extending through the periphery of the pulley $a^\times$ in the direction of the head $b'$ of the bolt is inserted a locking-key C, which is cylindrical in shape and wedge-shaped at the lower end $c$ and fitted to the socket $b^3$ in the bolt-head $b'$. The other end portion $c'$ of the key C is cut in an oblique direction and is perforated at $c^2$, through which perforation a slight distance below the opening in the periphery $a^x$ of the pulley is inserted a screw $c^3$, which penetrates the pulley in a direction tangential to its axis or shaft and prevents the bolt B from turning.

In securing the pulley to the shaft the separable parts of the pulley are fitted with its particular bushing, or placed directly on the shaft in the usual manner. The screw-threaded ends of the transverse clamping-bolts are inserted in the respective bolt-grooves and carried to the opening in the nuts and by means of any ordinary screw-driver fitted to the opening or socket $b^3$. The bolts are turned sufficiently to enter the nuts and clamp or removably secure the separate parts of the pulley to the shaft.

The pulley, instead of being turned from one solid piece, may be made in layers, as shown by horizontal lines in Fig. 3, and the pockets made in a sectional part or layer, so as to hold the nuts and the perforations for the bolt-shanks cut in the usual way, if preferred.

In my pulley the nut cannot turn, as the size and shape of the pocket and nut are almost equal, and as the threaded end of the bolt passes through the nut the length of the groove is sufficient to permit the adjustment of the nut thereon the distance required. In this manner none of the parts of the pulley are liable to be disjointed or the clamping bolts and nuts displaced. The thickness of the web of the pulley may vary and be less than that of the periphery, sufficient depth only being required to afford the depth to the pocket and grooves.

Having fully described my invention, what I now claim as new, and desire to secure by Letters Patent, is—

1. A pulley having a solid web and separable in one direction upon a line transverse to the axis and in the other in the line of the diameter of said axis and provided with clamping bolts and nuts, each one of said transverse parts of said pulley having registering grooves upon its inner side in parallel lines transverse to and on both sides of said axis projected through to the periphery of said pulley, and retaining-pockets intersecting with said grooves, one of which pockets at each side of the axis is adapted to retain the bolt-head and the other the nut, substantially as described.

2. A separable pulley united in the line of the diameter of the shaft and each one of the separate parts thereof having perforations in parallel lines transverse to said shaft projected through to the periphery of said pulley, and pockets intersecting said perforations, clamping bolts and nuts in the respective perforations, and locking-keys in said peripheral perforations engaging with the said bolts, substantially as and for the purpose described.

VANTYLE W. CODDINGTON.

Witnesses:
S. L. C. HASSON,
W. M. COYLE.